United States Patent
Xu et al.

(10) Patent No.: US 12,406,154 B2
(45) Date of Patent: Sep. 2, 2025

(54) SYSTEMS AND METHODS FOR SEARCH BASED NEURAL TEXT GENERATION MODELS

(71) Applicant: Salesforce, Inc., San Francisco, CA (US)

(72) Inventors: Jiacheng Xu, Sunnyvale, CA (US); Yingbo Zhou, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 290 days.

(21) Appl. No.: 18/310,272

(22) Filed: May 1, 2023

(65) Prior Publication Data

US 2024/0160855 A1 May 16, 2024

Related U.S. Application Data

(60) Provisional application No. 63/383,850, filed on Nov. 15, 2022.

(51) Int. Cl.
   G06F 40/40    (2020.01)
   G06F 16/3331  (2025.01)
   G06F 40/284   (2020.01)

(52) U.S. Cl.
   CPC .......... *G06F 40/40* (2020.01); *G06F 16/3331* (2019.01); *G06F 40/284* (2020.01)

(58) Field of Classification Search
   CPC ........ G06F 16/9024; G06F 40/40; G06N 5/01
   See application file for complete search history.

(56) References Cited

U.S. PATENT DOCUMENTS

| | | | | |
|---|---|---|---|---|
| 5,416,892 A | * | 5/1995 | Loken-Kim | G06V 30/373 |
| | | | | 382/187 |
| 2013/0238240 A1 | * | 9/2013 | Tamai | G01C 21/34 |
| | | | | 701/527 |
| 2020/0175229 A1 | * | 6/2020 | Iwakura | G06N 3/08 |
| 2021/0073291 A1 | * | 3/2021 | Hunter | G06F 16/1858 |
| 2022/0004720 A1 | * | 1/2022 | Wu | G06N 3/04 |
| 2023/0377748 A1 | * | 11/2023 | Yang | G06N 3/08 |
| 2024/0160855 A1 | * | 5/2024 | Xu | G06F 16/9024 |

OTHER PUBLICATIONS

Xu et al., "Massive-scale decoding for text generation using lattices." arXiv preprint arXiv:2112.07660 (Year: 2021).*

Meister et al. "Best-first beam search." Transactions of the Association for Computational Linguistics 8 (2020): 795-809. (Year: 2020).*

* cited by examiner

*Primary Examiner* — Samuel G Neway
(74) *Attorney, Agent, or Firm* — Haynes and Boone, LLP

(57) ABSTRACT

Embodiments described herein provide systems and methods for text generation using a natural language processing model. Natural language input is received and encoded by an encoder. A decoder generates a plurality of next-node probabilities for a set of candidate nodes that are next to at least one of K previously decoded paths of nodes on a directed search graph. Scores are computed for each of the candidate nodes and done in parallel among the K previously decoded paths. The highest scoring K nodes are selected for addition to the directed search graph. The search continues until a search budget is exhausted. Generated sequences are output. These sequences may represent a plurality of sentences or questions, depending on the task.

20 Claims, 13 Drawing Sheets

| Method | Stat | | | Diversity (↑) | | | Oracle (↑) | | | | | | Natural (↑) | Quality (↑) | | | | |
|---|---|---|---|---|---|---|---|---|---|---|---|---|---|---|---|---|---|---|
| | S | |S| | ISI | D-1 | D-2 | D-3 | R1 | R2 | RL | R1 | R2 | RL | MV | R1 | R2 | RL | MTR | GRM |
| BS | 10 | 10 | 10 | 44.8 | 48.7 | 46.9 | 32.6 | 12.9 | 30.1 | | | | 59.5 | 25.9 | 9.2 | 23.7 | 20.9 | 88.9 |
| DBS | 10 | 10 | 9 | 52.3 | 52.2 | 47.6 | 30.1 | 9.5 | 26.4 | | | | 41.5 | 24.2 | 7.3 | 21.3 | 18.7 | 85.2 |
| DBS+ | 10 | 10 | 9 | 55.8 | 53.1 | 45.8 | 26.1 | 6.8 | 23.4 | | | | 13.7 | 20.3 | 4.5 | 17.8 | 14.9 | 85.7 |
| BTYP0.2 | 10 | 1 | 1 | 29.9 | 27.8 | 24.3 | 24.2 | 7.0 | 22.0 | | | | 53.5 | 23.5 | 6.7 | 21.4 | 18.3 | 90.8 |
| BTYP0.5 | 10 | 2 | 2 | 30.5 | 28.4 | 24.7 | 25.0 | 7.5 | 22.7 | | | | 48.1 | 24.7 | 7.2 | 22.4 | 19.2 | 92.5 |
| BTYP0.95 | 10 | 2 | 2 | 30.9 | 28.9 | 25.4 | 26.9 | 8.6 | 24.8 | | | | 61.4 | 25.0 | 7.6 | 23.1 | 19.5 | 92.3 |
| BNCLS0.5 | 10 | 1 | 1 | 28.1 | 25.0 | 21.1 | 24.9 | 7.0 | 22.7 | | | | 51.2 | 24.9 | 7.0 | 22.8 | 18.2 | 92.3 |
| BNCLS0.8 | 10 | 2 | 2 | 30.1 | 28.0 | 24.4 | 25.6 | 7.9 | 23.7 | | | | 49.9 | 25.1 | 7.3 | 23.1 | 19.1 | 92.5 |
| BNCLS0.9 | 10 | 2 | 2 | 30.8 | 28.7 | 25.2 | 26.0 | 8.2 | 24.0 | | | | 58.6 | 25.1 | 7.5 | 23.0 | 19.3 | 91.2 |
| TYP0.2 | 10 | 5 | 5 | 44.4 | 46.2 | 42.4 | 26.5 | 7.3 | 23.9 | | | | 50.9 | 23.2 | 6.3 | 21.1 | 18.1 | 88.3 |
| TYP0.5 | 10 | 7 | 7 | 48.5 | 52.0 | 47.9 | 30.1 | 10.6 | 27.3 | | | | 71.0 | 24.0 | 6.5 | 21.9 | 18.0 | 91.8 |
| TYP0.85 | 10 | 9 | 9 | 54.3 | 59.4 | 55.7 | 31.2 | 11.2 | 28.5 | | | | 84.3 | 22.1 | 6.1 | 20.1 | 17.1 | 89.5 |
| NCLS0.5 | 10 | 5 | 5 | 40.2 | 41.4 | 37.7 | 29.2 | 9.9 | 26.3 | | | | 58.3 | 24.9 | 7.3 | 22.9 | 18.6 | 93.9 |
| NCLS0.8 | 10 | 8 | 8 | 50.8 | 55.1 | 51.3 | 30.5 | 10.2 | 27.3 | | | | 47.7 | 24.3 | 6.2 | 21.6 | 18.2 | 91.1 |
| NCLS0.9 | 10 | 9 | 9 | 53.2 | 58.2 | 53.7 | 31.2 | 11.5 | 28.7 | | | | 46.0 | 23.6 | 6.9 | 21.4 | 18.0 | 90.9 |
| MixQG | - | - | - | - | - | - | - | - | - | | | | - | 24.9 | 8.0 | 22.3 | - | - |
| BKSmean | 20 | 20 | 20 | 50.8 | 56.1 | 54.0 | 33.9 | 14.2 | 31.0 | | | | 83.0 | 27.0 | 8.9 | 24.5 | 21.3 | 86.8 |
| BKSlast | 19 | 19 | 19 | 53.4 | 59.4 | 55.9 | 32.7 | 13.4 | 30.1 | | | | 69.4 | 26.0 | 8.4 | 23.2 | 19.7 | 91.7 |

FIG. 6

| | ISI | $\bar{D}$ | $\bar{OR}$ | $\bar{R}$ | Mv | GRM | MTR |
|---|---|---|---|---|---|---|---|
| BS | 10 | 40.6 | 42.1 | 40.3 | 23.4 | 88.3 | 42.7 |
| DBS | 10 | 48.2 | 42.6 | 37.9 | 21.6 | 79.2 | 37.3 |
| DBS+ | 10 | 54.1 | 42.4 | 36.4 | 15.9 | 77.5 | 35.8 |
| BTyp$_{0.2}$ | 2 | 27.4 | 36.3 | 38.0 | 27.0 | 83.8 | 40.0 |
| BTyp$_{0.5}$ | 2 | 26.7 | 37.7 | 40.4 | 17.1 | 88.9 | 43.0 |
| BTyp$_{0.95}$ | 2 | 27.9 | 38.4 | 40.7 | 14.6 | 89.2 | 43.3 |
| BNcls$_{0.5}$ | 1 | 24.3 | 37.1 | 40.5 | 11.9 | 87.9 | 43.1 |
| BNcls$_{0.8}$ | 2 | 27.0 | 38.5 | 41.0 | 16.9 | 89.5 | 43.5 |
| BNcls$_{0.9}$ | 2 | 27.4 | 38.5 | 40.9 | 15.4 | 89.6 | 43.6 |
| Typ$_{0.2}$ | 9 | 55.4 | 40.5 | 34.9 | 37.9 | 79.3 | 37.8 |
| Typ$_{0.5}$ | 10 | 55.0 | 42.4 | 37.1 | 37.8 | 82.2 | 39.3 |
| Typ$_{0.95}$ | 10 | 61.0 | 39.5 | 33.7 | 41.7 | 74.9 | 36.1 |
| Ncls$_{0.5}$ | 8 | 44.6 | 41.1 | 39.2 | 24.6 | 86.2 | 41.5 |
| Ncls$_{0.8}$ | 10 | 55.7 | 41.7 | 36.5 | 31.7 | 82.0 | 38.6 |
| Ncls$_{0.9}$ | 10 | 59.7 | 41.2 | 35.6 | 41.5 | 79.4 | 38.0 |
| BKS$_{mean}$ | 27 | 45.7 | 41.4 | 38.2 | 19.2 | 83.8 | 41.0 |
| BKS$_{last}$ | 22 | 51.4 | 43.3 | 37.6 | 34.6 | 84.7 | 39.3 |

FIG. 7

| GBS / DBA / NeuroLogic* |
|---|
| G: A dog is run over by a ball and mouth agape. |
| D: A dog is run over by a ball and bites his mouth. |
| N: A dog running with a ball in its mouth. |

| NCLS₀.₈ / TYP₀.₃ / Ours |
|---|
| A dog running around with a ball in his mouth. |
| The dog is running with a ball in his mouth. |
| The dog runs away with the ball out of the mouth. |
| A dog running on its mouth with a ball |
| A dog with a ball running around his mouth. |
| A dog with a ball in its mouth running around the pond. |
| A dog runs to the door, eating a ball, and another dog in the mouth. |
| A dog running away with a ball in his mouth. |
| A dog running with a ball in his mouth. |
| A dog is running around its mouth catching a ball. |
| A dog is running around with a ball in its mouth. |
| a dog running around with a ball in its mouth |
| The dogs are running around with balls in their mouths. |
| Two dogs running around in the same room with a ball in their mouths. |
| Two dogs running with balls in their mouths. |

FIG. 8

| | ISI | $\bar{D}$ | $\bar{OR}$ | $\bar{R}$ | Mv | GRM | MTR |
|---|---|---|---|---|---|---|---|
| BS | 8 | 16.3 | 36.6 | 31.2 | 98.0 | 96.4 | 36.9 |
| DBS | 8 | 20.5 | 36.3 | 28.9 | 64.6 | 95.2 | 32.3 |
| DBS+ | 7 | 21.5 | 35.6 | 27.8 | 22.3 | 92.0 | 29.8 |
| BTYP$_{0.2}$ | 2 | 12.3 | 29.5 | 27.6 | 98.8 | 96.0 | 34.2 |
| BTYP$_{0.5}$ | 3 | 13.4 | 33.0 | 30.4 | 98.2 | 96.3 | 36.5 |
| BTYP$_{0.95}$ | 3 | 13.3 | 33.7 | 30.9 | 98.5 | 96.4 | 37.0 |
| BNCLS$_{0.8}$ | 3 | 13.2 | 33.5 | 30.8 | 98.5 | 96.3 | 37.1 |
| BNCLS$_{0.9}$ | 3 | 14.0 | 34.1 | 31.0 | 98.5 | 96.4 | 37.1 |
| TYP$_{0.2}$ | 7 | 30.9 | 34.2 | 26.7 | 97.8 | 94.7 | 31.3 |
| TYP$_{0.5}$ | 8 | 34.7 | 38.8 | 28.8 | 97.9 | 95.1 | 32.7 |
| TYP$_{0.95}$ | 8 | 35.7 | 38.5 | 28.1 | 98.4 | 95.1 | 32.3 |
| NCLS$_{0.8}$ | 8 | 35.3 | 38.8 | 28.7 | 98.1 | 95.1 | 32.9 |
| NCLS$_{0.9}$ | 8 | 37.2 | 37.7 | 27.3 | 98.5 | 94.4 | 31.4 |
| BKS$_{mean}$ | 22 | 21.4 | 39.0 | 31.9 | 90.5 | 95.3 | 35.9 |
| BKS$_{last}$ | 17 | 24.3 | 37.5 | 28.9 | 98.5 | 95.7 | 33.3 |

FIG. 9

| Sampling | $BKS_{0,0,0.8}$ | $BKS_{\infty,\infty,\infty}$ |
|---|---|---|
| NUCLS$_{0.8}$<br>What is the fifth largest city in OR? (x5)<br>What is the fifth-largest city in OR?<br>What is the fifth largest city in OR?<br>What is the fifth-largest city in the State of OR?<br>What is the fifth-largest city in the State of OR?<br>Which city in OR is the county seat of Washington County?<br>TYP$_{0.5}$<br>What is the fifth largest city in OR? (x3)<br>What is the fifth-largest city in OR? (x3)<br>Which city in OR is the county seat of Washington County?<br>Which city is the county seat of Washington County? | What city is the fifth largest?<br>What city is the fifth-largest city in the State?<br>What is the 5th largest city in OR?<br>What is the fifth largest city in [OR / the State of OR / the State]?<br>What is the fifth-largest city in the State of OR?<br>Which city is the fifth largest city in OR?<br>Which city is the fifth largest city?<br>Which is the fifth largest city?<br>Which OR city is the fifth largest in the state?<br>Which OR city is the fifth largest?<br>Which OR town is home to Intel?<br>Which OR town is home to the tech company Intel?<br>Which OR town is known as the Silicon Forest?<br>Which OR town is the fifth largest [0 / city / city in the state / in size / in the state]? | What city in OR is the fifth largest in OR?<br>What city is the fifth largest [0 / city in OR / city in the State / in OR / in the state]?<br>What city is the fifth-largest in the State?<br>What is the fifth largest city in OR?<br>What is the fifth largest city in the State?<br>Which city in OR has the largest population?<br>Which city in OR hosts Intel?<br>Which city in OR is known as the Silicon Forest?<br>Which city in OR is the fifth largest in OR?<br>Which city in OR is the fifth largest in the state?<br>Which city is the fifth largest [0 / city in OR / city / in the state]?<br>Which OR city is the county seat of Washington County?<br>Which OR city is the fifth largest in size?<br>Which OR city is the fifth largest? |

Input (Ans || Context): Hillsboro || Hillsboro is the fifth-largest city in the State of Oregon and is the county seat of Washington County. Lying in the Tualatin Valley on the west side of the Portland metropolitan area, the city hosts many high-technology companies, such as Intel, that comprise what has become known as the Silicon Forest. At the 2010 Census, the city's population was 91,611. For thousands of years before the arrival of ... Reference Question: What city is Intel located in?

FIG. 10

|  | \|S\| | $\bar{D}$ | ORIGIN | BLEU COMET | Δ |
|---|---|---|---|---|---|
| Reference | 11 | 36.9 | - | - | - |
| BS | 10 | 15.4 | 30.4 | 32.3 | 1.9 |
| DBS | 10 | 18.7 | 25.0 | 27.8 | 2.8 |
| DBS+ | 10 | 24.6 | 20.8 | 22.9 | 2.1 |
| BTYP$_{0.2}$ | 3 | 11.0 | 26.5 | 26.1 | -0.4 |
| BTYP$_{0.5}$ | 3 | 10.2 | 34.3 | 34.6 | 0.3 |
| BTYP$_{0.95}$ | 3 | 10.7 | 32.9 | 33.4 | 0.5 |
| BNCLS$_{0.5}$ | 2 | 9.0 | 33.0 | 33.3 | 0.3 |
| BNCLS$_{0.8}$ | 3 | 10.2 | 34.9 | 34.9 | 0.0 |
| BNCLS$_{0.9}$ | 3 | 10.4 | 32.6 | 33.8 | 1.2 |
| TYP$_{0.2}$ | 9 | 27.2 | 19.9 | 19.5 | -0.3 |
| TYP$_{0.5}$ | 9 | 28.6 | 25.6 | 27.0 | 1.4 |
| TYP$_{0.95}$ | 10 | 36.5 | 19.2 | 22.1 | 2.9 |
| NCLS$_{0.5}$ | 8 | 18.6 | 31.1 | 32.2 | 1.1 |
| NCLS$_{0.8}$ | 10 | 30.2 | 25.9 | 27.0 | 1.0 |
| NCLS$_{0.9}$ | 10 | 35.0 | 23.2 | 25.8 | 2.6 |
| BKS$_{mean}$ | 35 | 19.6 | 30.1 | 33.3 | 3.2 |
| BKS$_{last}$ | 33 | 20.5 | 26.1 | 31.1 | 5.0 |

FIG. 12

SYSTEMS AND METHODS FOR SEARCH BASED NEURAL TEXT GENERATION MODELS

CROSS REFERENCE(S)

The instant application is a nonprovisional of and claims priority under 35 U.S.C. 119 to U.S. provisional application no. 63/383,850, filed Nov. 15, 2022, which is hereby expressly incorporated by reference herein in its entirety.

TECHNICAL FIELD

The embodiments relate generally to natural language processing and machine learning systems, and more specifically to systems and methods for search based neural text generation models.

BACKGROUND

Machine learning systems have been widely used in various natural language processing (NLP) tasks, such as question answering, intent classification, document summarization, machine translation, and/or the like. These NLP models often require a good decoding strategy to generate quality text sequences. Existing NLP models mostly employ beam search algorithms to search for text tokens as outputs of the model. However, the generated strings from beam search are usually repetitive and similar, making the output text sequences lacking diversity.

Therefore, there is a need for NLP decoders with improved diversity and accuracy.

BRIEF DESCRIPTION OF THE DRAWINGS

FIGS. 5-12 provides charts illustrating exemplary performance of different embodiments described herein.

Figure 1A:
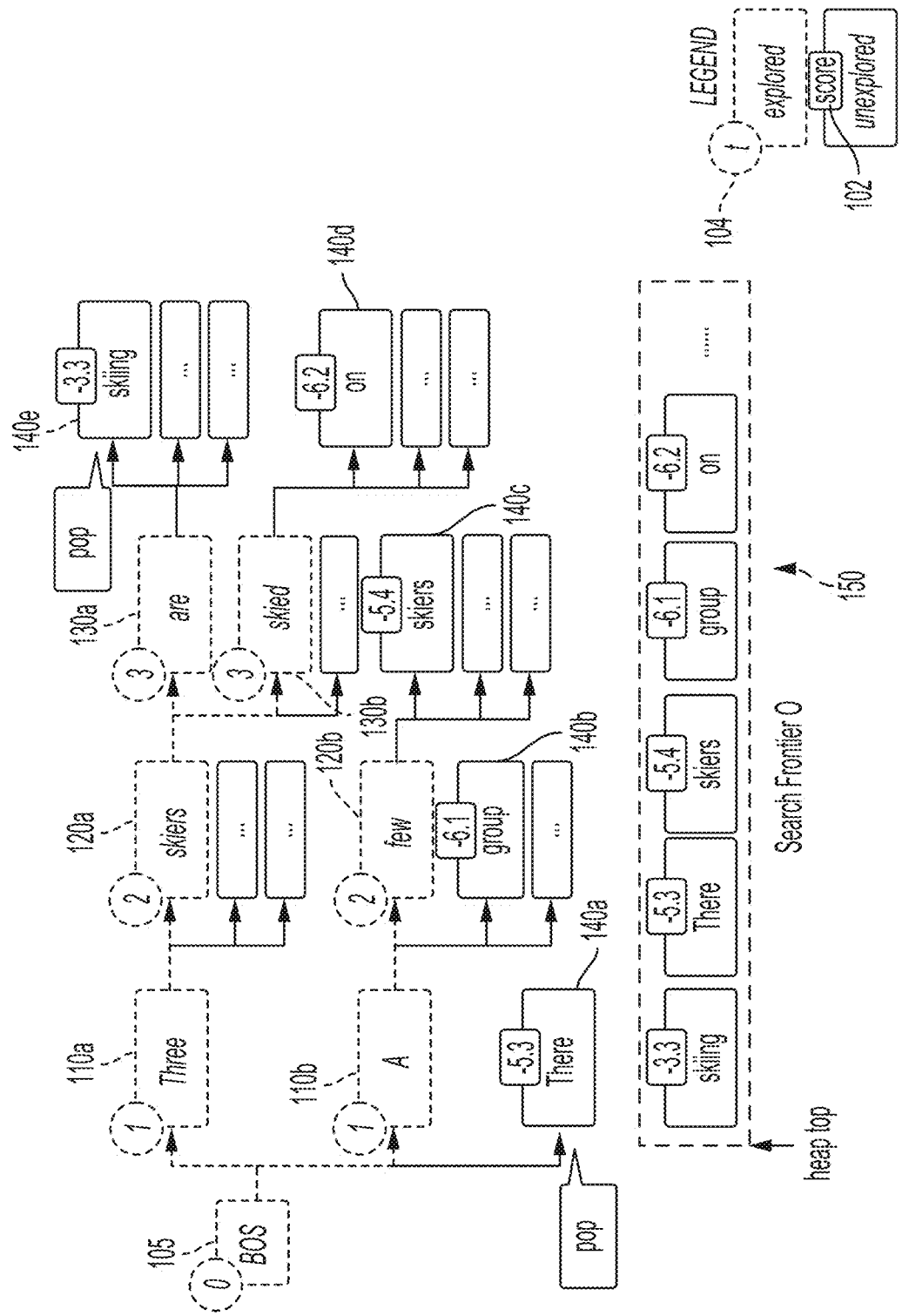
FIG. 1A is a simplified diagram illustrating a best-k search framework, according to embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

A decoder of a natural language processing (NLP) model generates a probability $p(y/x)$ for a string y given the input sequence x. Thus, a decoding strategy can often affect the quality of output sequences of the NLP model. Some existing NLP models employ beam search techniques to search for text tokens as outputs of the model. However, the generated strings from beam search are usually repetitive and similar, i.e., the output text sequences lack diversity. The gain from diversity-promoting variations of beam search is usually limited at the cost of engineering effort. Other NLP models may adopt sampling based decoding approaches, which may achieve better diversity in output sequences, but the high variance, high redundancy, and low controllability brought by the stochastic nature often impairs decoding performance. Other more computationally-intense decoding methods, such as model-based and rollout-based approaches require extra effort of engineering or training, incurring higher cost for deployment.

In view of the need for a computationally efficient decoding strategy that achieves output diversity, embodiments described herein provide a graph-based NLP text decoding framework, referred to as best-k search, that generates a number k of decoded token based on a directed search graph representing relationships between token candidates.

Specifically, the directed search graph is built such that its each node represents a triplet of a word/token, a score of the respective node, and a time of discovery. The score of the respective node is given as a confidence level of the currently generated path of tokens including the respective node. The NLP text decoding framework may then adopt a greedy search algorithm according to the scoring mechanism. For example, at each iteration, candidate nodes with the highest scores are output from the decoding framework and selected for addition to the directed search graph. Selection of the nodes is referred to as "popping" the nodes. The process of finding the next k candidates ends when a predefined budget is reached. By popping more than a single node at each time step, multiple explorations of the landscape are carried out in parallel. Each of the completed root-to-leaf path on the search graph can be decoded by a language model to produce an example sentence. Such parallel exploration reduces the running time compared to best first search. A temporal decay mechanism may also be added to the framework to encourage search completions. A memoryless scoring function is added as an alternative to more complicated length-adjusted counterparts. In this way, the resulting best k-search provides an efficient and deterministic decoding paradigm, which results in diverse, natural and high-quality outputs.

Embodiments described herein provide a number of benefits. For example, the resulting best-k search provides an efficient and deterministic decoding paradigm, which results in diverse, natural and high-quality outputs. Specifically, the best k-search decoding algorithm is portable deterministic, free of training and parameters, and compatible with any language model. In addition, the parallel computational scheme in the best k-search significantly reduces running time and therefore improves system efficiency.

Overview

Figure 1B:
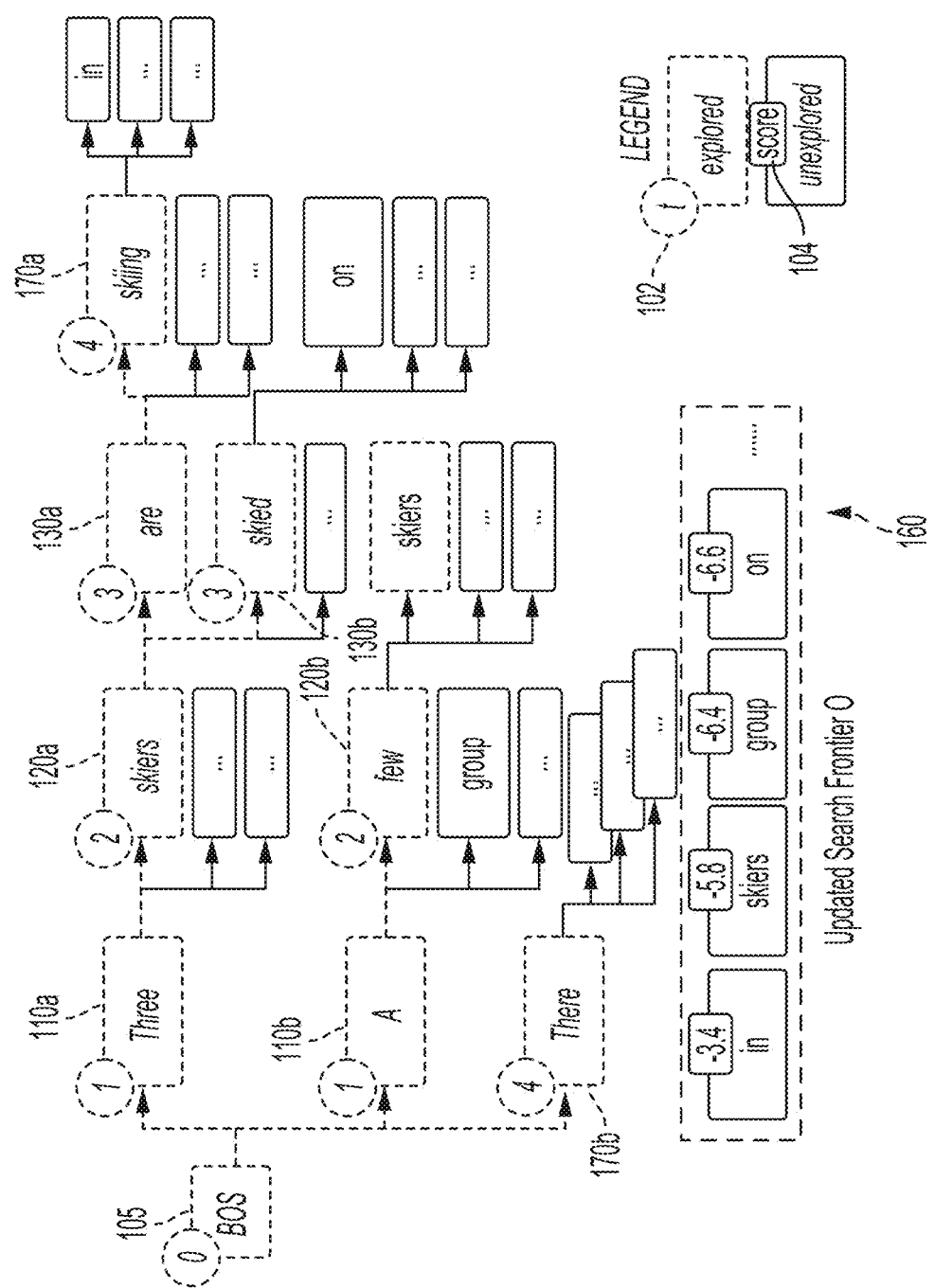
FIG. 1B is a simplified diagram illustrating a best-k search framework, according to embodiments described herein.

FIGS. 1A and 1B are simplified diagrams illustrating a best-k search framework, according to some embodiments.

In one example, FIGS. 1A and 1B depict a directed search graph representation of the best-k search framework with k=2 and a natural language input text consisting of the set of words, "mountain ski skier." Generating the directed search graph is an iterative process, and each iteration is referred to as a timestep or iteration. The best-k search framework represented as a directed search graph includes nodes with associated labels for the time of discovery of the node 102 and score 104. Each node may comprise at least three pieces of information, including the score 102, the generated token in the vocabulary of the model (e.g., "Three" in node 110a), and the time of the discovery 104 of the node. These three pieces of information may be referred to as a triplet. Every sequence of triplets in the directed search graph begins with a starting token, referred to as the BOS node 105, and will eventually terminate with an ending token. The conditions for terminating a sequence are further described in relation to FIG. 4A.

In one embodiment, FIG. 1A depicts a directed search graph after three timesteps. When a node is selected to be appended to a sequence, it is said to be "popped." Selection of a node is determined by its score. The score may, at least in part, depend on the time of discovery or previous nodes in the sequence. At the first timestep, nodes 110a-b, representing tokens "three" and "A," are popped. Nodes 110a-b are appended to the BOS node 105, resulting in two sequences. At the second timestep, nodes 120a-b are popped. Node 120a is appended to the sequence of nodes 105,110a. Node 120b is appended to the sequence of nodes 105,110b. After the second timestep there are two sequences comprising the directed search graph. At the third timestep, nodes 130a-b are popped. Node 130a is appended to the sequence of nodes 105,110a, 120a. Node 130b is appended to the sequence of nodes 105,110a, 120a. After the third timestep there are three sequences comprising the directed search graph; in addition to the two sequences ending in nodes 130a-b, there is the sequence given by nodes 105, 110b, 120b. After three timesteps, the directed search graph depicted in FIG. 1A includes a beginning token, called the BOS node, 105, and explored nodes 110a-b, 120 a-b, 130 a-b. The unexplored nodes 140a-e may be all or a subset of the entire set of unexplored nodes. The unexplored nodes are scored based on the scoring described herein and collected in a search frontier depository 150. The search frontier depository 150 includes unexplored nodes which may be considered for popping/appending at the next timestep. The unexplored nodes may include nodes discovered from the most recent decoded paths/sequences in the directed search graph and nodes discovered from earlier decoded paths/sequences. In some instances, the earlier decoded paths/sequences are subpaths/subsequences (i.e., paths or sequences which have one or more less nodes than other paths/sequences in the directed search graph for later iterations) of the most recent decoded paths/sequences. The search frontier depository in a best-k search framework may store a combination of the candidate nodes corresponding to the k previously decoded paths and additional potential candidate nodes generated from previously decoded paths that are from a previous decoding time step but are different from the k previously decoded paths. Furthermore, nodes may be removed from the search frontier depository if they are selected for popping.

FIG. 1B depicts the directed search graph after a fourth timestep—one timestep more than FIG. 1A. At the fourth timestep, previously unexplored nodes 140a,e are popped becoming explored nodes 170a-b. Node 170a is appended to the sequence of nodes 105, 110a, 120a, 130a. Node 170b is appended to node 105. The new search frontier depository 160 is updated, at least in part, by the removal of the nodes 170a-b from search frontier depository 150.

Thus, the framework for generating sequences is that of a directed search graph, where BOS 105 is the root node and EOS are the leaf nodes. Any node, except for the root node has only one parent node. A completed sequence is thus a sequence of triplets whose first entry is BOS and final entry is EOS. A priority queue may be constructed from a search frontier depository of the graph by applying additional scoring to the nodes. The priority queue may contain a plurality of the nodes which are candidates for popping. In some embodiments the nodes in the priority queue may be ranked based on their scores. It should be appreciated in the description herein that words associated with nodes may denote their encoding in a representation space of a language model.

Computer and Network Environment

Figure 2:
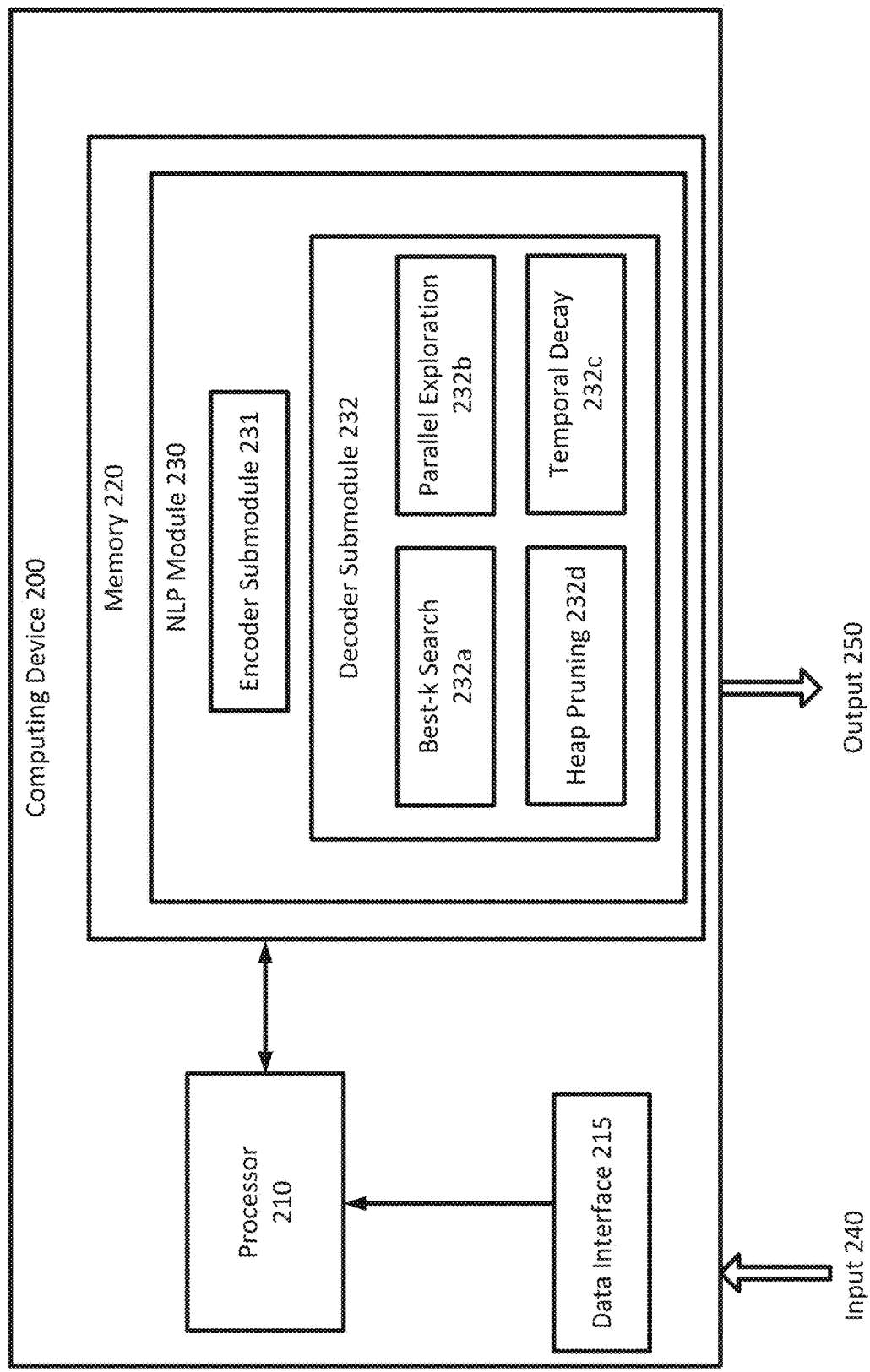
FIG. 2 is a simplified diagram illustrating a computing device implementing the best-k search framework described in FIGS. 1A and 1B, according to one embodiment described herein.

FIG. 2 is a simplified diagram illustrating a computing device implementing the best-k search framework described in FIGS. 1A, 1B, 4A, and 4B, according to one embodiment described herein. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for an NLP module 230 that may be used to implement and/or emulate the systems and models, and/or to implement any of the methods described further herein. NLP module 230 may receive input 240 such as an input training data (e.g., text) via the data interface 215 and generate an output 250 which may be textual sentences reflecting the concepts of the input text. Examples of the input data may include text. Examples of the output data may include complete sentences based on the input text.

The data interface 215 may comprise a communication interface, a user interface (such as a voice input interface, a graphical user interface, and/or the like). For example, the computing device 200 may receive the input 240 (such as a training dataset) from a networked database via a communication interface. Or the computing device 200 may receive the input 240, such as a collection of words, from a user via the user interface.

In some embodiments, the NLP module 230 is configured to generate a plurality of sentences. The NLP module 230 may further include an encoder submodule 231 and decoder submodule 232. In some aspects, the decoder submodule 232 may further include Best k-Search submodule 232*a* (e.g., similar to 450 in FIG. 4), Parallel Exploration submodule 232*b* (e.g., similar to 402 in FIG. 4), Temporal Decay submodule 232*c* (e.g., similar to 404 in FIG. 4), and Heap Pruning 232*d* (e.g., similar to 406 in FIG. 4).

In one embodiment, the NLP module 230 and its encoder and decoder submodules 231, 232 may be implemented by hardware, software and/or a combination thereof.

In one embodiment, the NLP module 230 and one or more of its submodules 231, 232 may be implemented via an artificial neural network. The neural network comprises a computing system that is built on a collection of connected units or nodes, referred as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 220 as a structure of layers of neurons, and parameters describing the non-linear transformation at each neuron and the weights associated with edges connecting the neurons. An example neural network may be a transformer network as used in T5 models, and/or the like.

In one embodiment, the neural network based NLP module 230 and one or more of its submodules 231-232 may be trained by updating the underlying parameters of the neural network based on a training loss. For example, the training loss is a metric that evaluates how far away a neural network model generates a predicted output value from its target output value (also referred to as the "ground-truth" value). Given the loss computed (e.g., a cross-entropy loss comparing the predicted output 250 from the best k-search and the ground-truth value), the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate a predicted output value closer to the target output value. Some examples of computing devices, such as computing device 200 may include non-transitory, tangible, machine readable media that include executable code that when run by one or more processors (e.g., processor 210) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3:
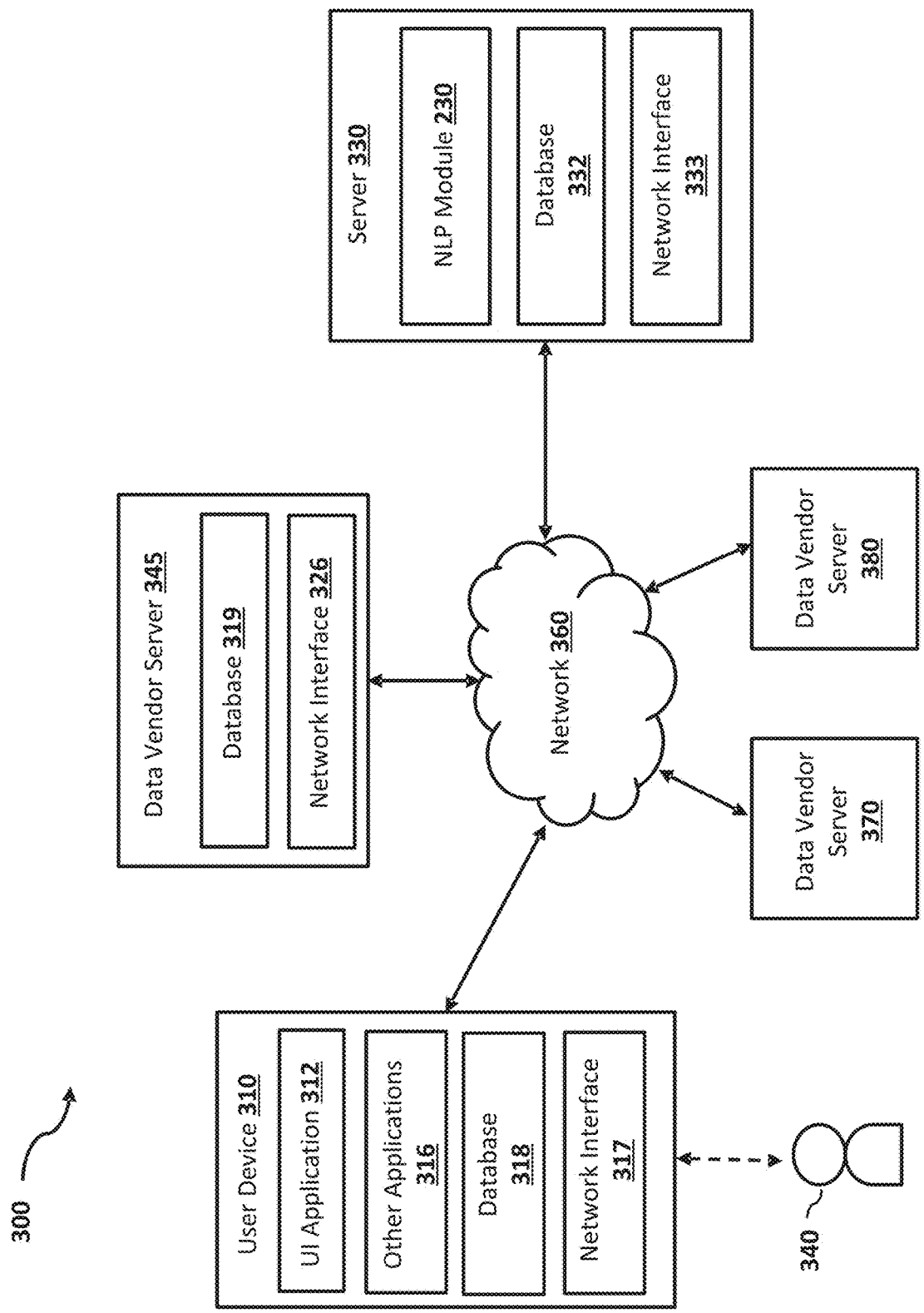
FIG. 3 is a simplified block diagram of a networked system suitable for implementing the best-k search framework described in FIGS. 1A and 1B and other embodiments described herein.

FIG. 3 is a simplified block diagram of a networked system 300 suitable for implementing the best-k search framework described in FIGS. 1 and 4 and other embodiments described herein. In one embodiment, system 300 includes the user device 310 which may be operated by user 340, data vendor servers 345, 370 and 380, server 330, and other forms of devices, servers, and/or software components that operate to perform various methodologies in accordance with the described embodiments. Exemplary devices and servers may include device, stand-alone, and enterprise-class servers which may be similar to the computing device 200 described in FIG. 2, operating an OS such as a MICROSOFT® OS, a UNIX® OS, a LINUX® OS, or other suitable device and/or server-based OS. It can be appreciated that the devices and/or servers illustrated in FIG. 3 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 310, data vendor servers 345, 370 and 380, and the server 330 may communicate with each other over a network 360. User device 310 may be utilized by a user 340 (e.g., a driver, a system admin, etc.) to access the various features available for user device 310, which may include processes and/or applications associated with the server 330 to receive an output data anomaly report.

User device 310, data vendor server 345, and the server 330 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

User device 310 may be implemented as a communication device that may utilize appropriate hardware and software configured for wired and/or wireless communication with data vendor server 345 and/or the server 330. For example, in one embodiment, user device 310 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 310 of FIG. 3 contains a user interface (UI) application 312, and/or other applications 316, which may correspond to executable processes, procedures, and/or applications with associated hardware. For example, the user device 310 may receive a message indicating textual sentence generation is complete from the server 330 and display the message via the UI application 312. In other embodiments, user device 310 may include additional or different modules having specialized hardware and/or software as required.

In various embodiments, user device 310 includes other applications 316 as may be desired in particular embodiments to provide features to user device 310. For example, other applications 316 may include security applications for implementing client-side security features, programmatic client applications for interfacing with appropriate application programming interfaces (APIs) over network 360, or other types of applications. Other applications 316 may also include communication applications, such as email, texting, voice, social networking, and IM applications that allow a user to send and receive emails, calls, texts, and other notifications through network 360. For example, the other application 316 may be an email or instant messaging application that receives a prediction result message from the server 330. Other applications 316 may include device interfaces and other display modules that may receive input and/or output information. For example, other applications 316 may contain software programs for asset management, executable by a processor, including a graphical user interface (GUI) configured to provide an interface to the user 340 to view textual sentences.

User device 310 may further include database 318 stored in a transitory and/or non-transitory memory of user device 310, which may store various applications and data and be utilized during execution of various modules of user device 310. Database 318 may store user profile relating to the user 340, predictions previously viewed or saved by the user 340, historical data received from the server 330, and/or the like. In some embodiments, database 318 may be local to user device 310. However, in other embodiments, database 318 may be external to user device 310 and accessible by user device 310, including cloud storage systems and/or databases that are accessible over network 360.

User device 310 includes at least one network interface component 317 adapted to communicate with data vendor server 345 and/or the server 330. In various embodiments, network interface component 317 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 345 may correspond to a server that hosts database 319 to provide training datasets including sets of words to the server 330. The database 319 may be implemented by one or more relational database, distributed databases, cloud databases, and/or the like.

The data vendor server 345 includes at least one network interface component 326 adapted to communicate with user device 310 and/or the server 330. In various embodiments, network interface component 326 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 345 may send asset information from the database 319, via the network interface 326, to the server 330.

The server 330 may be housed with the NLP module 230 and its submodules described in FIG. 2. In some implementations, NLP module 230 may receive data from database 319 at the data vendor server 345 via the network 360 to generate a plurality of textual sentences. The generated textual sentences may also be sent to the user device 310 for review by the user 340 via the network 360.

The database 332 may be stored in a transitory and/or non-transitory memory of the server 330. In one implementation, the database 332 may store data obtained from the data vendor server 345. In one implementation, the database 332 may store parameters of the NLP module 230. In one implementation, the database 332 may store previously generated textual sentences, and the corresponding input feature vectors.

In some embodiments, database 332 may be local to the server 330. However, in other embodiments, database 332 may be external to the server 330 and accessible by the server 330, including cloud storage systems and/or databases that are accessible over network 360.

The server 330 includes at least one network interface component 333 adapted to communicate with user device 310 and/or data vendor servers 345, 370 or 380 over network 360. In various embodiments, network interface component 333 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 360 may be implemented as a single network or a combination of multiple networks. For example, in various embodiments, network 360 may include the Internet or one or more intranets, landline networks, wireless networks, and/or other appropriate types of networks. Thus, network 360 may correspond to small scale communication networks, such as a private or local area network, or a larger scale network, such as a wide area network or the Internet, accessible by the various components of system 300.

Example Work Flows

Figures 4A, 4B:
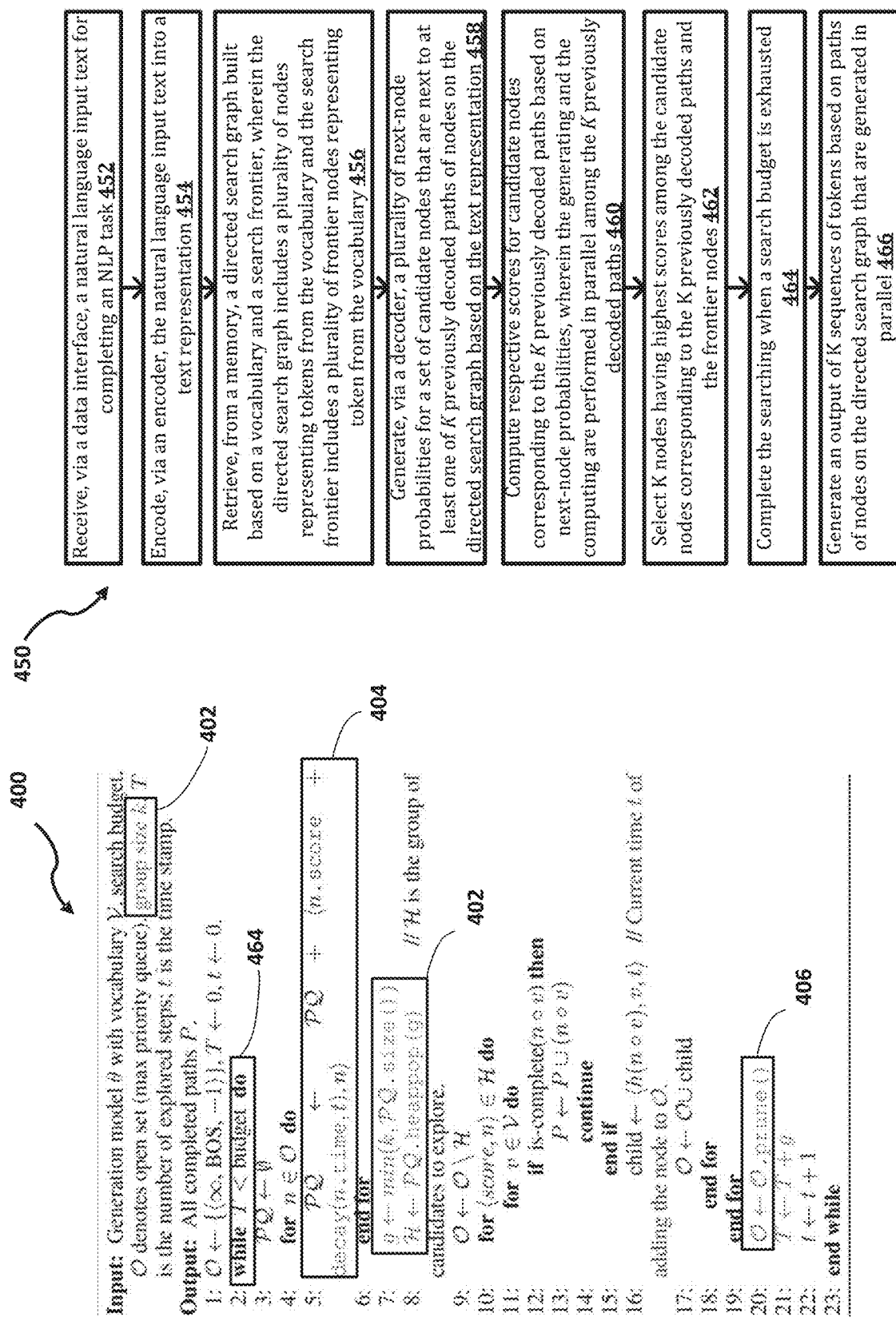
FIG. 4A is pseudo-code segment suitable for implementing the best-k search framework, according to embodiments described herein.
FIG. 4B is a simplified logic flow diagram illustrating a method of best-k search, according to embodiments described herein.

FIG. 4A provides an example pseudo-code segment 400 illustrating a method of text generation based on the framework shown, and described in relation to, in FIGS. 1A and 1B. FIG. 4B provides an example logic flow diagram 450 illustrating a method for text generation according to the pseudo-code segment 400 in FIG. 4A, according to some embodiments described herein. One or more of the processes of method 450 may be implemented, at least in part, in the form of executable code stored on non-transitory, tangible, machine-readable media that when run by one or more processors may cause the one or more processors to perform one or more of the processes. In some embodiments, method 450 corresponds to an example operation of the NLP module 230 depicted, and described in relation to, in FIG. 2.

The pseudo-code segment 400 comprises a number of steps which implement some or all of the features depicted in, or described in relation to, FIGS. 1A, 1B, and method 450. The implementation of pseudo-code segment 400 may be accomplished via a computer 200 or other network system, e.g., 300. The pseudo-code segment includes at least the example implements of parallel exploration 402, temporal decay 404, and heap pruning 406.

As described in relation to FIGS. 1A-1B, the framework for generating sequences is that of a directed search graph, where BOS 105 is the root node and EOS are the leaf nodes. Any node, except for the root node has only one parent node. A completed sequence is thus a sequence of triplets whose first entry is BOS and final entry is EOS. The EOS node will be added once the conditional function "is-complete" returns an output representing that a token of the vocabulary completes the sequence. A priority queue $\mathcal{PQ}$ may be constructed from a search frontier depository $\mathcal{O}$ of the graph by applying the temporal decay score to the nodes. It should be appreciated in the description herein that words associated with nodes may denote their encoding in the representation space of the large language model.

As shown by the pseudo code segment 400, the best-k search framework may perform a number of operations, including at least determining a search budget (e.g., as appears in pseudo-code segment 400 and 464), parallel exploration (e.g., as implemented in the pseudo-code segment 400 at least in lines 7-8, 402), temporal decay (e.g., as implemented in the pseudo-code segment 400 at least in line 5, 404), heap pruning (e.g., as implemented in the pseudo-code segment 400 at least in line 20, 406). In some embodiments, only a subset of these operations may be used in the framework.

In one implementation, the search budget determines the total number of nodes that will be popped while employing the best-k search framework. The budget may be determined by use cases. For example, if the expected generation of sequences is very long, then the budget will need to be set higher to complete the search. In general, a larger budget will mean a longer time to complete the search for sequences.

In one implementation, parallel exploration 402 enables a batch-wise exploration in the search graph.

The parallel exploration strategy reduces the exploration time cost by popping k nodes from the priority queue each time and executing them in a batch. Batching multiple step-by-step operations are practically much faster than unbatched when GPUs are engaged. The priority queue is generated by applying scoring to the nodes in the search frontier depository (e.g. 150 and 160 in FIGS. 1A and 1B). Parallel exploration significantly improves the efficiency of best-k search compared to best first search (hereinafter, "BFS"). The parallel exploration feature is implemented, at least in part, by the functions min(−, −) and heappop(−). Heappop selects a specified number of highest scoring nodes.

In some implementations, the score is a function of the probability of a next token given the preceding sequence. Such functions can take a number of forms. There are at least three classes of scoring functions. One scoring function may be the sequence log-likelihood, which is given by the mathematical expression $$h(y) = \sum_{t=0}^{l} \log p_\theta(y_t \mid y_{<t}, x) \qquad (2)$$

Another may be the length-adjusted scoring function, which is given by the mathematical expression $$h(y) = \frac{1}{|y|^\alpha} \sum_{t=0}^{l} \log p_\theta(y_t \mid y_{<t}, x) \qquad (3)$$

where α is a tunable parameter that determines preferred length for generated sequences. Another may be a memoryless scoring function, which is given by the mathematical expression $$h(y) = \log p_\theta(y_t \mid y_{<t}, x) \qquad (4)$$

In each of these scoring functions, Eqns. (2)-(4), y is the entire sequence of token/words reflecting the hypothesis, $y_t$ is the t-th token/word appended to the sequence, $y_{<t}$ is the without the t-th token/word $y_t$, θ are the parameters of the model, and x is the input to the model. The input x might a include a list of words, sometimes referred to as a concept set. These scores are reflected in pseudo-code segment 400 by the function "score".

In one embodiment, temporal decay 404 yields higher completion rates and fewer dangling nodes in the search graph. Temporal decay is applied to increase completion rates. Each node in the search frontier depository, i.e., 150 in FIG. 1A and 160 in FIG. 1B, includes a time stamp 104. That time stamp reflects the timestep at which the unexplored node was discovered by the popping of another node. When nodes are selected for inclusion in the directed search graph, their scores are modified by adding an auxiliary score. The auxiliary score rewards recently discovered nodes. In doing so, the method will tend to continue adding to recently discovered nodes. The decay function (e.g., as used in line 5, 404) that comprises the auxiliary score may be monotonic with respect to its time dependence. In some embodiments, the mathematical expression of the decay function may take the form:

$$\mathrm{decay}(n\cdot\mathrm{time}, t) = -\kappa(t - n\cdot\mathrm{time})^\beta \qquad (5)$$

where t is the current timestep and n·time is a past timestep, κ>0 controls the weight of the term, and β>0 control the slope. In some embodiments, other functional forms for the temporal decay function may be used. As a general feature, the temporal decay function produces lower scores for nodes added to the search frontier depository at times more distant from the current timestep relative to those added more recently to the search frontier depository. In this way, recently discovered nodes are more likely to be popped than others discovered further in the past.

In one embodiment, heap pruning 406 improves the time and space efficiency of the best-k search framework.

To improve computational efficiency, a maximize size is imposed on the search frontier depository, e.g., the "prune" operation 406. In some embodiments, there may be no more than 500 nodes, also referred to as frontier nodes, in the search frontier depository. In yet more embodiments, the maximum size may be determined a margin between the top scorer and a score lower than which the corresponding node will not be included. The choice of margin may depend, at least in part, on factors including the intensity of temporal decay, the remaining search budget, model calibration, and resource limitations. In addition, a threshold on the probability may be set such that generations with probability lower than the threshold are discarded. In some embodiments, the threshold, γ, is set to 0.05. The threshold on the probability controls what can get into the heap or search frontier, while pruning heap controls the maximum size of the heap.

As illustrated, the method 450 includes a number of enumerated steps, but aspects of the method 450 may include additional steps before, after, and in between the enumerated steps. In some aspects, one or more of the enumerated steps may be omitted or performed in a different order.

At step 452, a natural language input text (e.g., input 240 in FIG. 2, and "mountain ski skier" as used to generate the directed search graph depicted in FIGS. 1A and 1B) for completing an NLP task is received via a data interface (e.g., 215 in FIG. 2). In some embodiments the NLP task may be text generation in the form of sentence generation or question generation.

At step 454, the natural language text (e.g., input 240 in FIG. 2) is encoded via an encoder (e.g., 231 in FIG. 2) into a text representation. Similar to step 452, the natural language may be a collection of words or sentences and/or questions.

At step 456, a directed search graph (as described herein in relation to FIGS. 1A and 1B) that includes a plurality of nodes (e.g., 105, 110a-b, 120a-b, 130a-b, and 170a-b in FIGS. 1A and 1B) representing tokens from the vocabulary and a search frontier depository (e.g., 150 and 160 in FIGS. 1A and 1B, respectively) that includes a plurality of frontier nodes representing tokens from the vocabulary are retrieved from a memory (e.g. 220 in FIG. 2).

At step 458, a decoder (e.g., 232 in FIG. 2) generates a plurality of next-node probabilities for a set of candidate nodes (e.g., nodes 120a-b in FIG. 1A) that are next to at least one of K previously decoded paths of nodes (e.g., 105, 110a-b in FIG. 1A) on the search graph based on the text representation.

At step 460, respective scores (e.g., 102 in FIGS. 1A and 1B and as described herein with respect to Eqns. 2-4) for candidate nodes (e.g., nodes 120a-b in FIG. 1A) corresponding to the K previously decoded paths based on next-node probabilities are computed (e.g., by a processor 210 which in some embodiments is associated with a server, e.g., 330, 345, 370, and 380). Step 458 and Step 460 may be performed in parallel among the K previously decoded paths (e.g., 402 in the pseudo-code segment 400). In some embodiments the score may be augmented by a time decay score (e.g., Eqn. 5 and related description as well as line 5, 404, in the pseudo-code segment 400).

At step 462, K candidate nodes having highest scores are selected among the candidate nodes corresponding to the K previously decoded paths and the frontier nodes (i.e., those contained in the search frontier depository 150, 160 in FIGS. 1A and 1B). In some embodiments, the method may include the removal or addition of nodes to the search frontier depository (e.g., 150,160 in FIGS. 1A and 1B, respectively). Furthermore, the number of nodes in the search frontier depository may controlled through heap pruning as described herein, including by setting a margin on the difference in scores and/or threshold for the probability associated with the token represented by the node.

At step 464, searching is completed when a search budget is exhausted (e.g., 408 in the pseudo-code segment 400).

At step 466, an output of sequences of tokens is generated based on paths of nodes on the directed search graph that are generated in parallel.

Example Results

FIGS. 5-12 represent exemplary test results using embodiments described herein. Two typical configurations are denoted $BKS_{last}$ and $BKS_{mean}$. In $BKS_{last}$, the scoring function is memoryless (e.g., Eqn. 4). And $BKS_{mean}$ uses a length-adjusted scoring function (e.g., Eqn. 3) with $\alpha=1$. For the experiments, the k in best-k search is chosen to be 5 and 10, and the weight κ of temporal decay is chosen to be 0.0, 0.01, 0.05, 0.1, and 0.2. The configuration with the best diversity and quality is reported.

Comparisons are made to Beam Search (BS) as described in *Carnegie-Mellon University Computer Science Dept.*, Speech understanding systems: A summary of results of the five-year research effort at Carnegie-Mellon University, 1977; Diverse Beam Search (DBS) as described in Vijaykumar et al., Diverse beam search for improved description of complex scenes, in Proceedings of the AAAI Conference on Artificial Intelligence 32(1), 2018; Nucleus Sampling (NCLS) as described in Holtzman et al., The curious case of neural text degeneration, in International Conference on Learning Representations, 2020; Typical Sampling (TYP) as described in Meister et al., Locally typical sampling, arXiv: 2202.00666, 2022; and Beam Sampling, which includes a collection of beam search multinomial sampling methods. For example, integration of Beam Search with Typical Sampling and Nucleus Sampling, denoted BNCLS and BTYP, respectively. Comparisons are also made to GBS, DBA, and NEUROLOGIC as described in Lu et al., NeuroLogic a*esque decoding: Constrained text generation with lookahead heuristics, in Proceedings of the 2022 Conference of the North American Chapter of the Association for Computational Linguistics: Human Language Technologies, pp. 780-799, 2022.

Multiple scoring metrics are used. The number of completed strings and the number of unique completed strings are reported as S and |S|. The distinctness of completions, measured as the number of unique n-grams divided by the number of words are reported as D-1, D-2, and D-3, following Li et al., A diversity-promoting objective function for neural conversation models, in Proceedings of the 2016 Conference of the North American Chapter of the Association for Computational Linguistics: Human Language Technologies, pp. 110-119, 2016, and following Yang and Klein, FUDGE: Controlled text generation with future discriminators, in Proceedings of the 2021 Conference of the North American Chapter of the Association for Computational Linguistics: Human Language Technologies, pp. 3511-3535, 2021. Two relevance-based metrics are reported, ROUGE (R1, R2, RL) and METEOR (MTR). ROUGE is described in Lin, ROUGE: A package for automatic evaluation of summaries, in Text Summarization Branches Out, pp. 74-81, 2004. METEOR is described in Banerjee and Lavie, METEOR: An automatic metric for MT evaluation with improved correlation with human judgments, in Proceedings of the 2017 Conference on Empirical Methods in Natural Language Processing, pp. 936-945, 2017. MAUVE is used as a metric for open-ended text generation and is described in Pillutla et al., MAUVE: Measuring the gap between neural text and human text using divergence frontiers, in Advances in Neural Information Processing Systems, pp. 4816-4828, 2021.

Datasets used in the comparisons for evaluating the best-k search framework include SQuAD as described in Rajpurkar et al., SQuAD: 100,000+ questions for machine comprehension of text, in Proceedings of the 2016 Conference on Empirical Methods in Natural Language Procession, pp. 2383-2392, 2016; DROP as described in Dua et al., DROP: A reading comprehension benchmark requiring discrete reasoning over paragraphs, in Proceedings of the 2019 Conference of the North American Chapter of the Association for Computational Linguistics: Human Language Technologies, Volume 1, pp. 2368-2378, 2019; QuoRef as described in Dasigi et al., Quoref: A reading comprehension dataset with questions requiring coreferential reasoning, in Proceedings of the 2019 Conference on Empirical Methods in Natural Language Processing and the $9^{th}$ International Joint Conference on Natural Language Processing, pp. 5925-

5932, 2019; CommonGen as described in Lin et al., CommonGen: A constrained text generation challenge for generative commonsense reasoning, in Findings of the Association for Computation LinguisticsL EMNLP 2020, pp. 1823-1840, 2020; XSum as described in Narayan et al., Don't give me the details, just the summary! Topic-aware convolutional neural networks for extreme summarization, in Proceedings of the 2018 Conference on Empirical Methods in Natural Language Processing, pp. 1797-1807, 2018; A machine translation dataset based on WMT' 14 En-Fr and En-De as described in Ott et al., Analyzing uncertainty in neural machine translation, in Proceedings of the 35$^{th}$ International Conference on Machine Learning, pp. 3956-3965, 2018. The WMT' 14 En-Fr and En-De are described in Bojar et al., Findings of the 2014 workshop on statistical machine translation, in Proceedings of the Ninth Workshop on Statistical Machine Translation, pp. 12-58, 2014.

Models used in the comparisons for evaluating the best-k search framework include mBART as described in Tang et al., Multilingual translation from denoising pre-training, in Findings of the Association for Computational Linguistics: ACL-IJCNLP 2021, pp. 3450-3466, 2021; COMET-QE as described in Rei et al., COMET: A neural framework for MT evaluation, in Proceedings of the 2020 Conference on Empirical Methods in Natural Language Processing, pp. 2685-2702, 2020; BART-large-XSum as described in Lewis et al., BART: Denoising sequence-to-sequence pre-training for natural language generation, translation, and comprehension, in Proceedings of the 58$^{th}$ Annual Meeting of the Association of Computational Linguistics, pp. 7871-7880, 2020; MixQG as described in Murakhovs'ka et al., in Finding of the Association for Computational Linguistics: NAACL 2022, pp. 1486-1497, 2022; and T5 fine-tuned on CommonGen as described at https://huggingface.co/mrm8488/t5-base-finetuned-common_gen.

Figure 5:
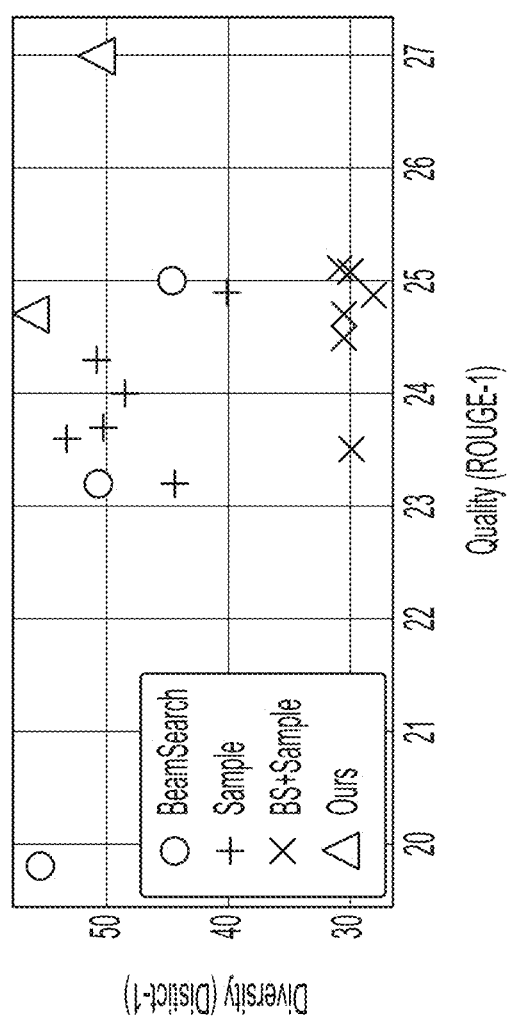

FIG. 5 is graph depicting the performance of various baselines and the best-k search framework on a question generation task. The two marks corresponding to the label "Ours" refer to the configurations $BKS_{last}$ and $BKS_{mean}$. Generated text diversity and quality are measured by Distinctness-1 and ROUGE-1 (higher scores are favorable). The dataset used in QuoRef and the model applied is MixQG. Best-k search beats baseline methods including beam search variations, sampling and BS+Sample methods on diversity and quality.

FIG. 6 is a table depicting extensive result on QuoRef question generation. S and |S| stand for the number of sentences and the unique number of sentences. D-1, -2, and -3 stand for unigram, bigram, and trigram distinctness. Mv is the MAUVE score measuring the naturalness of the generated output. MTR is the METEOR score. GRM measures the grammaticality.

FIG. 7 is table depicting results of on commonsense generation. Additional scores are defined as follows: $\overline{D}$ is the average of D-1, D-2, and D-3; $\overline{OR}$ and $\overline{R}$ are the average of Oracle ROUGE and ROUGE scores, respectively.

FIG. 8 is a table showing examples from CommoGen where the input is "ball dog mouth run." The first outputs presented are from GBS, DBA, and Neuro Logic*. Then there are five outputs from $N_{CLS_{0.8}}$, $TYP_{0.5}$, and $BKS_{last}$, respectively.

FIG. 9 is a table showing results for text summarization on XSum and BART-XSum. Embodiments described herein are competitive in quality, diversity, and naturalness.

FIG. 10 is a table showing examples on QuoRef question generation. The duplication of sampling (e.g., the "(x5)" appearing in the first question of the Sampling column) is high is baseline methods whereas $BKS_{last}$ and $BKS_{mean}$ generate a more diverse set of questions.

Figure 11:
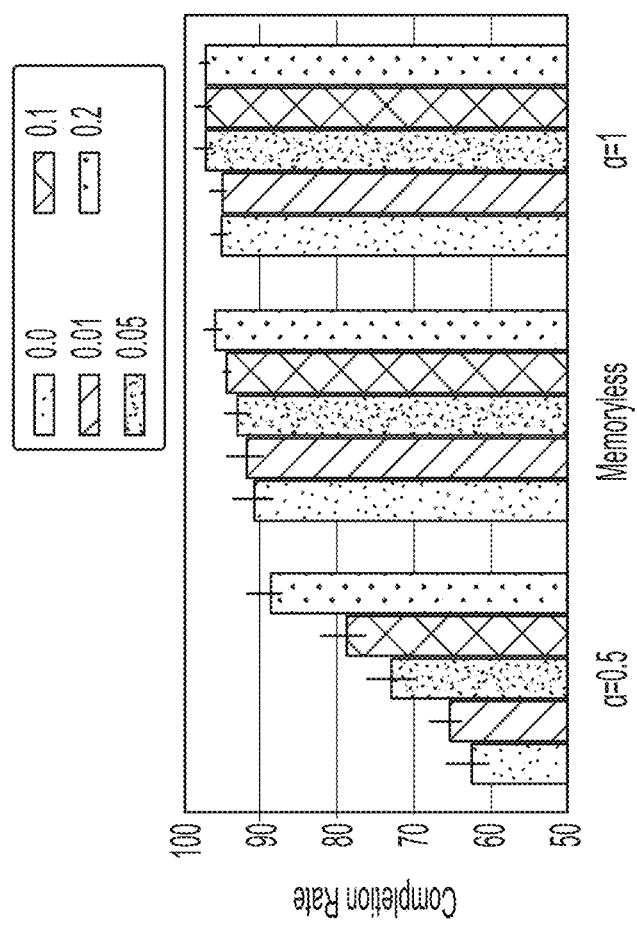

FIG. 11 is a chart evaluating the completion rates for differing weight term κ for temporal decay and different choices of the scoring function, Eqn. (3) with α=0.5, 1 and Eqn. (4). In the case of α=0.5, increased weight significantly helps completion rate.

FIG. 12 is a table depicting scores on a machine translation task from English to German. ORIGIN and COMET are the BLEU score before and after reranking; Δ indicates the change of BLEU score from reranking. Both $BKS_{last}$ and $BKS_{mean}$ achieve significant gains upon reranking.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of text generation in a natural language processing (NLP) model, the method comprising:
  receiving, via a data interface, a natural language input text for completing an NLP task;
  encoding, via an encoder of the NLP model, the natural language input text into a text representation;
  retrieving, from a memory, a directed search graph built based on a vocabulary, wherein the directed search graph includes a plurality of nodes representing tokens from the vocabulary;
  performing, by a decoder of the NLP model, parallel searching on the directed search graph along multiple decoding paths to generate a sequence of output tokens, including:
    generating, via the decoder, a plurality of next-node probabilities for a set of candidate nodes that are next to K previously decoded paths of nodes on the directed search graph based on the text representation, and computing, for the K parallel decoded paths, respective scores for candidate nodes corresponding to the K previously decoded paths based on next-node probabilities, wherein the generating and the computing are performed in parallel among the K previously decoded paths;

selecting K nodes having highest scores from at least the candidate nodes as next nodes for the K previously decoded paths, respectively;

completing the parallel searching when a search budget is exhausted; and generating an output of sequences of tokens based on paths of nodes on the directed search graph, the paths of nodes being generated in parallel.

2. The method of claim 1, wherein the K nodes are selected from a search frontier depository, and wherein the search frontier depository stores a combination of the candidate nodes corresponding to the K previously decoded paths and additional potential candidate nodes generated from previously decoded paths that are from a previous decoding time step but are different from the K previously decoded paths.

3. The method of claim 1, further comprising continuing searching for, based on an updated directed search graph including the selected K candidate nodes, next candidate nodes.

4. The method of claim 1, wherein the respective scores include a temporal component that favors candidate nodes from previously decoded paths having more recently discovered nodes.

5. The method of claim 2, wherein the search frontier depository stores a maximum number of nodes and wherein the maximum number is determined based on a ranking of the respective scores.

6. The method of claim 5, wherein the maximum number is determined, at least in part, further based on the search budget.

7. The method of claim 1, wherein the search budget decreased is by K when the K candidate nodes are selected.

8. The method of claim 1, wherein the respective scores are determined, at least in part, by one of a sequence log-likelihood, a length-adjusted log-likelihood, or a memoryless log-likelihood.

9. A system for text generation, the system comprising:
a memory that stores a natural language processing (NLP) model a directed search graph and a plurality of processor executable instructions;
a communication interface that receives a natural language input text for completing an NLP task; and
one or more hardware processors that read and execute the plurality of processor-executable instructions from the memory to perform operations comprising:
encode, via an encoder of the NLP model, the natural language input text into a text representation;
retrieve, from a memory, the directed search graph built based on a vocabulary, wherein the directed search graph includes a plurality of nodes representing tokens from the vocabulary;
perform, by a decoder of the NLP model, parallel searching on the directed search graph along multiple decoding paths to generate a sequence of output tokens, including:
generate, via the decoder, a plurality of next-node probabilities for a set of candidate nodes that are next to K previously decoded paths of nodes on the directed search graph based on the text representation;

compute, for the K parallel decoded paths, respective scores for candidate nodes corresponding to the K previously decoded paths based on next-node probabilities, wherein the generating and the computing are performed in parallel among the K previously decoded paths;

select K nodes having highest scores from at least the candidate nodes as next nodes for the K previously decoded paths, respectively;

complete the parallel searching when a search budget is exhausted; and generate an output of sequences of tokens based on paths of nodes on the directed search graph, the paths of nodes being generated in parallel.

10. The system of claim 9, wherein the K nodes are selected from a search frontier depository, and wherein the search frontier depository stores a combination of the candidate nodes corresponding to the K previously decoded paths and additional potential candidate nodes generated from previously decoded paths that are from a previous decoding time step but are different from the K previously decoded paths.

11. The system of claim 9, wherein the processor is further configured to continue searching for, based on an updated directed search graph including the selected K candidate nodes, next candidate nodes.

12. The system of claim 9, wherein the respective scores include a temporal component that favors candidate nodes from previously decoded paths having more recently discovered nodes.

13. The system of claim 10, wherein the search frontier depository stores a maximum number of nodes and wherein the maximum number is determined based on a ranking of the respective scores.

14. The system of claim 13, wherein the maximum number is determined, at least in part, further based on the search budget.

15. The system of claim 9, wherein the search budget is decreased by K when the K candidate nodes are selected.

16. The system of claim 9, wherein the respective scores are determined, at least in part, by one of a sequence log-likelihood, a length-adjusted log-likelihood, or a memoryless log-likelihood.

17. A non-transitory machine-readable medium comprising a plurality of machine-executable instructions which, when executed by one or more processors, are adapted to cause the one or more processors to perform operations comprising:
receiving, via a data interface, a natural language input text for completing an NLP task;
encoding, via an encoder of the NLP model, the natural language input text into a text representation;
retrieving, from a memory, a directed search graph built based on a vocabulary, wherein the directed search graph includes a plurality of nodes representing tokens from the vocabulary;
performing, by a decoder of the NLP model, parallel searching on the directed search graph along multiple decoding paths to generate a sequence of output tokens, including:
generating, via the decoder, a plurality of next-node probabilities for a set of candidate nodes that are next to K previously decoded paths of nodes on the directed search graph based on the text representation, and computing, for the K parallel decoded paths, respective scores for candidate nodes corresponding to the K previously decoded paths based on next-node probabilities, wherein the generating and the computing are performed in parallel among the K previously decoded paths;

selecting K nodes having highest scores from at least the candidate nodes as next nodes for the K previously decoded paths, respectively;

completing the parallel searching when a search budget is exhausted; and generating an output of sequences of tokens based on paths of nodes on the directed search graph, the paths of nodes being generated in parallel.

18. The non-transitory machine-readable medium of claim 17, wherein the K nodes are selected from a search frontier depository, and wherein the search frontier depository stores a combination of the candidate nodes corresponding to the K previously decoded paths and additional potential candidate nodes generated from previously decoded paths that are from a previous decoding time step but are different from the K previously decoded paths.

19. The non-transitory machine-readable medium of claim 17, further comprising continuing searching for, based on an updated directed search graph including the selected K candidate nodes, next candidate nodes.

20. The non-transitory machine-readable medium of claim 17, wherein the respective scores include a temporal component that favors candidate nodes from previously decoded paths having more recently discovered nodes.

* * * * *